Feb. 26, 1957
C. A. BADEAU
2,783,297
CLEVIS-FORMING ELECTRICAL CONNECTOR
Filed Oct. 23, 1953
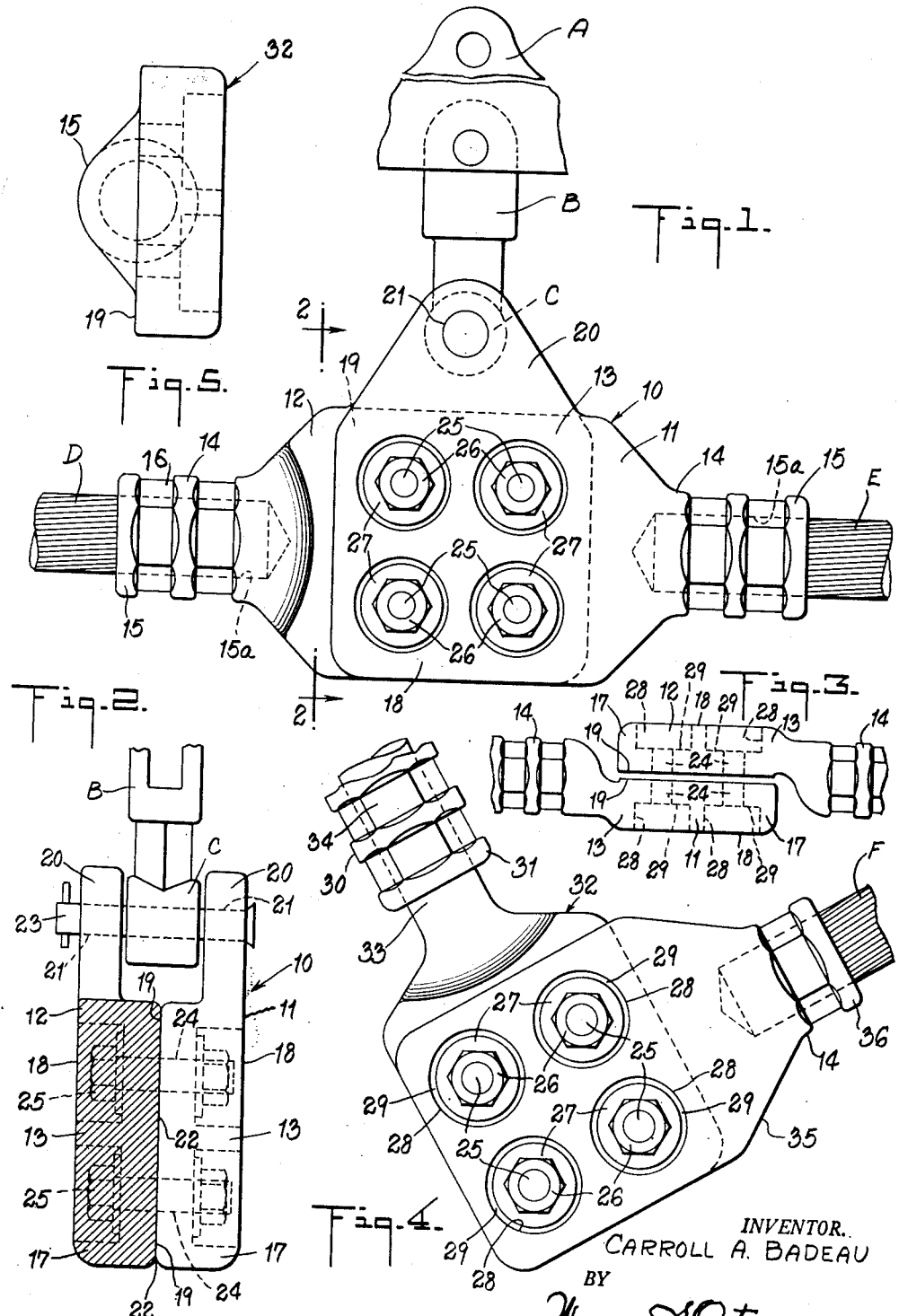
INVENTOR.
CARROLL A. BADEAU
BY
Warren S. Orton
ATTORNEY United States Patent Office 2,783,297
Patented Feb. 26, 1957

2,783,297

CLEVIS-FORMING ELECTRICAL CONNECTOR

Carroll A. Badeau, Westfield, N. J., assignor to The Thomas & Betts Co., Elizabeth, N. J., a corporation of New Jersey Application October 23, 1953, Serial No. 387,932

9 Claims. (Cl. 174—44)

The invention relates to a tower-supported demountable fitting for electrically and mechanically connecting the adjacent ends of two conductors while suspended high in the air and supported from a tower either by a stand-off insulator or by a suspension insulator. The present disclosure constitutes a development of the invention disclosed in the companion application entitled "Lug-Type Suspension Fitting," Serial No. 393,995, filed November 24, 1953, by Martin D. Bergan.

The primary object of the present disclosure, as was the primary object of the disclosure in the above-identified application, is to provide an overhead power line having two adjacent ends, which line can be easily opened or sectionalized at the tower which supports it for tests, repair and replacement purposes, and the line as a whole restored to service without necessity under some conditions, as in testing, to lower to the ground or otherwise displace the part or end not being tested or replaced.

In this case, as well as in the above-identified companion application, this objective is attained by separating the main power line at the tower to form the adjacent ends and locating the two ends of the line so separated, in position so as to be conveniently reached by an operator on the tower which supports said adjacent ends of the power line, and by providing each conductor end with a lug-like terminal whose end portion includes a flat contact plate provided with bolt holes. In both cases the plates are disposed in overlapping relation and secured together, thus to connect the two parts of the power line by readily removable bolts passing through aligned bolt holes in the plates, which bolts are conveniently accessible to an operator on the tower.

In the companion case, the adjacent ends of the power line so connected by means of the fitting therein disclosed are replaceably suspended from the tower by means of a suspension clamp to which the two parts of the fitting are bolted. In such an arrangement it is necessary to unbolt at least one of the fitting halves or lugs from the suspension clamp before either one of the parts could be unbolted from the other and this, of course, involved an additional operative step before the two parts of the power line could be separated.

One of the objectives of the present disclosure is to provide a form of separable fitting which can be suspended from the tower without necessity of employing any suspension clamp as was done in the preferred form of the disclosure in the companion application. Broadly, this objective is attained in this disclosure by providing each of the two halves of the fitting with an apertured extension arranged when the plates are assembled and secured in back-to-back intercontacting relation to form a clevis to be hung from the usual insulator string found on dead end towers.

It has been found in the type of fittings herein disclosed that the interfaces formed at the joints when two plates are pressed flatwise one against the other as herein featured, developed an ohmic resistance to the free passing of current across such joints and this is especially true where the associated power line is intended to transmit currents of high intensity.

Accordingly, another object of the invention is to minimize this ohmic resistance and to provide a fitting which will permit the passage of current therethrough substantially without interference. Broadly, this is attained in this disclosure by making the contact faces of the two parts of the fitting of greater area than is shown in the fitting in the companion application, and by the use of more bolts, and more rugged bolts, than has been used heretofore, this in order to insure a molecular contact between the plates co-extensive with its entire interface, and in this way insure a more intimate contact between the contacting faces than has been known heretofore.

The invention has for another object the providing of a fitting in which the conductors secured to its separate parts may extend therefrom selectively either in alignment with each other or with one at right angles to the other.

Various other objects and advantages of the invention will be in part obvious from an inspection of the accompanying drawings and in part will be more fully set forth in the following particular description of one form of fitting embodying the invention, and the invention also consists in certain new and novel features of construction and combination of parts hereinafter set forth and claimed.

In the accompanying drawings,

Fig. 1 is a plan view with parts broken away of a fitting forming a preferred embodiment of the invention shown in operative position hung from a tower and featuring two terminals with square, overlapping plates bolted together with tubular extensions for connecting the adjacent ends of two cables in axial alignment and forming with the fitting a readily separable high tension power path.

Fig. 2 is a transverse sectional view taken on the line 2—2 of Fig. 1, looking in the driection indicated by the arrows;

Fig. 3 is a view in side elevation as viewed from the bottom of Fig. 1 with the bolts removed from the fitting and the terminal halves of the fitting separated slightly;

Fig. 4 is a plan view similar to Fig. 1 showing one of the terminal halves provided with a long stud in place of a tubular form, showing the terminal halves extending at 90 degrees from each other and shown with the stud depending from the jumper end of a dead-end; and Fig. 5 is a view in end elevation of either one of the square plates shown in Fig. 4.

In the drawings and referring first to Fig. 1, there is disclosed an overhead support A, such as the arm of a tower from which hangs an insulator string B, and from this in turn hangs a clevis eye C. Suspended from the clevis eye C is a two-part suspension fitting 10 particularly forming the subject matter of this disclosure and forming means for connecting and disconnecting at will the adjacent ends of two cable conductors D and E forming parts of a high tension power line. In the case illustrated the conductors are each formed of wire strands of aluminum of relatively large size, and in the illustrated instance is of 1,780,000 circular mils, 84–19 A. C. S. R.

The fitting 10 comprises two identical parts, halves or lugs 11 and 12, each being a one-piece casting of high conductivity aluminum alloy with characteristics similar to those of the conductors.

Each lug is of one piece and comprises a flat plate 13 at one end and from one side edge of which plate projects a long extension 14 forming the other end and designed to be drilled axially from its free end towards but not into the plate 13 to form the outer end of the extension as a tube 15 having a bore 15ª of a size to have the wire conductors inserted therein with a sliding fit.

The tubes 15 are each deformed by indentations 16 to crimp the same permanently onto the conductors therein following conventional practices in this respect. The plates are of the same size and each forms a relatively thick, solid, pad-like rectangular body portion 17 with rounded corners. The body portion has parallel flat faces, an outer face 18 and an inner face 19, each forming a square with rounded corners. Each plate is provided on one side with an integral extension 20 of about one-half the thickness of the body portion, spaced from the inner face 19 and whose outer face extends in prolongation of and in the same plane as the outer face 18. As shown in Fig. 1 the extensions 20 are of triangular form in side elevation and in each case is provided with a circular opening 21 extending therethrough. The inner faces 19 are machined flat and smooth.

The fittings are designed to be assembled with their body portions in back-to-back relation with the machined inner faces in contacting relation to form when the body portions are squeezed together a closed joint 22 designed to provide an interface therebetween with the least possible ohmic resistance to the passage of current from one to the other lug. When so assembled the two apertured extensions are in spaced-apart relation as shown in Fig. 2 to form a clevis. A cotter pin 23 is passed through the aligned openings 21 and through the clevis arm C located between the extensions 20. In this way the suspension 10 is free to oscillate about the cotter pin 23.

It is a feature of this disclosure that each of the body portions is provided with four bolt holes 24 equidistantly spaced apart, one centered in each quadrant of the plate, and located in the corners formed by each two adjacent sides. In other words, the centers of each of the bolt holes is at a corner of a square and each is equidistantly spaced from the center of such square. Readily removable fastening and squeezing means are passed through the bolt holes of the two body portions when the corresponding bolt holes register. This arrangement of four bolt holes at the corners of a square permits the lugs to be disposed in several positions, either with the tubular extension 14 in line with the conductors as shown in Figs. 1 and 2, or at right angles thereto as suggested in Fig. 4. In the case illustrated, the fastenings are headed bolts 25 whose threaded ends are provided with nuts 26 underlapped by flat washers 27. The bolts, nuts and washers are made from hot-dipped galvanized steel.

In the showing of Fig. 4, where the body portions are not provided with the clevis forming hanging extensions 20, the lugs may be assembled to bring their extensions 14 selectively either into alignment as shown in Fig. 1, or with one lug at right angles to its companion. It is suggested that the ends of the bolt holes 24 at the faces of the body portion be recessed to provide cylindrical pockets 28 dimensioned to locate the bolt heads and nuts within the outlines of the body portion. In this way, it is possible to cover the fitting with a duck seal type material to produce a smooth external surface to the connection. It is the intent here to provide the plates of sufficient mass to transmit therethrough the current for which the conductors are designed. The portion of each plate squeezed by the accumulated bolt pressures lies between the bottoms 29 of the pockets and the adjacent machine flat face 19. To give some idea of the thickness of the portions of the plates so squeezed, it is noted from Fig. 3 that each thickness is about one-half of the diameter of the associated bore of the tube 15 and thus the depth of the two squeezed thicknesses of the lapped plates is about equal to the diameter of the associated conductor.

One advantage of locating the bolt holes at the corners of the square is that the plates may be disposed in overlapping relation with their conductor engaging extensions 14 disposed wither in line as shown in Fig. 1 or at right angles to each other as shown in Fig. 4, or as may be best suited for the environmental conditions.

As above indicated, and as shown in Fig. 1, it is intended to locate the fitting directly below the tower arm which supports it. As suggested in the above-identified Bergan application, it is sometimes preferable to locate the disconnect offset from the tower, as, for instance, at one or both of the usual dead-ends which connect a jumper conductor with the adjacent end of a main power line. Such dead-ends are conventionally located on opposite sides of a tower and suspended therefrom by strut lines. In Fig. 4 there is shown part of one such dead-end 30 with its usual depending tubular extension 31 for receiving a jumper terminal supported thereby.

In the case illustrated in Fig. 4, one of the lugs 32 is as above described except that it is provided with a long solid stud 33 of cylindrical form in place of the tubular extension 15 disclosed in the preceding views. In this case the stud is inserted into the tubular extension 31 and the extension 31 and stud 33 are permanently secured together as by deforming the extension as shown by the depression 34 into a crimping engagement with the stud. In this way the lug 32 becomes a fixed and permanent part of the associated dead-end. In Fig. 4, the associated lug 35 has a tubular extension 36 as described for the tube 15 and which is crimped conventionally onto a stranded wire conductor F. In this case the showing of the conductor F may be considered as one end of a jumper by-passing the tower which supports it. The opposite ends of the jumper is similarly secured to the stud of a duplicate form of disconnect lug (not shown).

While the illustrated embodiment of the invention features the use of four bolts at the corners of a square, it is within the scope of the disclosure to provide three bolts arranged at the corners of an equilateral triangle so that the lugs may be relatively rotated into any one of several positions with the bolt holes registering.

I claim:

1. A suspension fitting comprising two similar lugs of conductive material each formed of one piece including a plate-like body portion with a flat face on one side, an elongated extension integral with the body portion, projecting from one side edge thereof and each such extension adapted to be connected with a conductor and each lug provided with an apertured extension projecting integrally from another side edge thereof and spaced from the plane which contains the flat face, the flat faces of the body portions being in back-to-back mutual electric contact and the apertured extensions being transversely spaced apart with their apertures in alignment and coacting to form a clevis adapted to receive a clevis eye, and readily disconnectable fastening and squeeze pressure means passing through and connecting the abutting body portions to secure the lugs together under a squeeze pressure to form a single unit.

2. The suspension fitting defined in claim 1, wherein each lug is a casting whose flat face is machined to provide a smooth contact surface for engagement with its companion machined smooth face of the other lug.

3. The fitting defined in claim 1, wherein the body portion of each lug is provided with four bolt holes extending therethrough, located at the corners of a square and adapted to be disposed in a plurality of registering positions, and the fastenings are four easily removable bolts, one for each registering pair of bolt holes.

4. The suspension fitting defined in claim 3, wherein each of the body portions forms a square in outline of the same size, adapted to fit one on the other and with the four bolt holes located in the quadrants of each body portion.

5. The suspension defined in claim 3, wherein the outer ends of each bolt hole are countersunk to provide a pocket fashioned to accommodate the heads and nuts of each bolt, leaving the outer side of the fitting free of projections and fashioned to receive a cover.

6. The combination with an overhead support, a clevis eye carried by the support and depending therefrom, a two-part metallic unit forming a connector provided at its upper side with a pair of extensions forming a clevis, a cotter pin carried by the clevis eye and to which the unit is hung for free oscillation, each of said parts of the unit forming a lug and provided with means for securing a conductor thereto, and each part including a pad-like plate having one side flat and machined smooth, the flat sides being in contacting relation, and bolts passed through the plates and operative to secure them together under load sufficient to cause the flat contacting sides to form an interface of low ohmic resistance to the passage of current from one to the other part.

7. A combined two-part fitting and suspension for hanging the same depending from an overhead support, comprising two fittings each provided with means for securing it to a conductor, each fitting being of one piece, including a pressure plate having one face machined flat and smooth and provided with a plurality of bolt holes extending therethrough, and each plate provided with an apertured extension projecting integrally from one side edge thereof and spaced from the flat smooth face to form one side of a clevis, said plates provided with bolt holes and disposed with their flat smooth faces in contacting relation, and bolts passed through the bolt holes to secure the pressure plates in their contacting relation under load to secure the two extensions in position to form a clevis and to secure the apertures in the clevis-forming extensions in registration to receive a cotter pin.

8. A fitting for electrically connecting two conductors and operative selectively to connect the conductors either in line or at right angles to each other, said fitting comprising two similar lugs each being of one piece and including a plate-like body portion having on one side a flat contact face and an elongated extension projecting from a side face thereof other than the flat contact face, said extensions being each fashioned for a crimping engagement with its associated conductor, the contact face of one of the lugs being in back-to-back bearing relation with the contact face of the other lug to form an interface therebetween, and each body portion provided with four bolt holes extending therethrough, located at the corners of a square and disposed with the bolt holes in mutual registering position in either of their operative positions, and four bolts, one for each pair of registering bolt holes and located therein, for securing the lugs in their mutual contacting relation.

9. The fitting defined in claim 8, wherein one of the extensions is tubular for crimping onto a conductor therein and the other is a solid stud of cylindrical form for fitting in a tubular support to be crimped thereby.

References Cited in the file of this patent

UNITED STATES PATENTS

| | | |
|---|---|---|
| 613,663 | Case | Nov. 8, 1898 |
| 1,218,216 | Schmid | Mar. 6, 1917 |
| 1,557,870 | Pachman | Oct. 20, 1925 |
| 1,621,530 | Fitzpatrick | Mar. 22, 1927 |
| 1,940,704 | Sumpter et al. | Dec. 26, 1933 |
| 2,427,184 | Bilodeau | Sept. 9, 1947 |